United States Patent [19]

Schuöcker et al.

[11] 4,319,202
[45] Mar. 9, 1982

[54] TRANSVERSELY ELECTRICALLY EXCITED ATMOSPHERIC PRESSURE GAS LASER WORKING IN PULSES (TEA LASER)

[75] Inventors: Dieter Schuöcker, Vienna; Werner Reif, Klosterneuburg, both of Austria

[73] Assignee: Voest-Alpine Aktiengesellschaft, Linz, Austria

[21] Appl. No.: 89,441

[22] Filed: Oct. 30, 1979

[30] Foreign Application Priority Data

Nov. 3, 1978 [AT] Austria ................. 7881/78
Oct. 12, 1979 [AT] Austria ................. 6664/79

[51] Int. Cl.³ ............................................ H01S 3/093
[52] U.S. Cl. ...................................... 372/83; 372/87
[58] Field of Search ................. 331/94.5 PE, 94.5 P

[56] References Cited

U.S. PATENT DOCUMENTS 3,662,284  5/1972  Beaulieu et al. ............ 331/94.5 PE Primary Examiner—William L. Sikes
Assistant Examiner—Léon Scott, Jr.
Attorney, Agent, or Firm—Brumbaugh, Graves, Donohue & Raymond

[57] ABSTRACT

A transversely electrically excited atmospheric pressure gas laser working in a pulsed mode (TEA laser) includes a cooled working gas conducted in circulation, a cooled cathode, an anode arranged at a distance from the cathode, and an open-worked auxiliary electrode arranged therebetween. The cooled cathode is designed as a metallic conducting, elongated cathode plate extending in the direction of the optical axis and the auxiliary electrode is arranged parallel to the cathode in the cathode drop region, in order to produce a glow skin covering the entire cathode.

5 Claims, 12 Drawing Figures

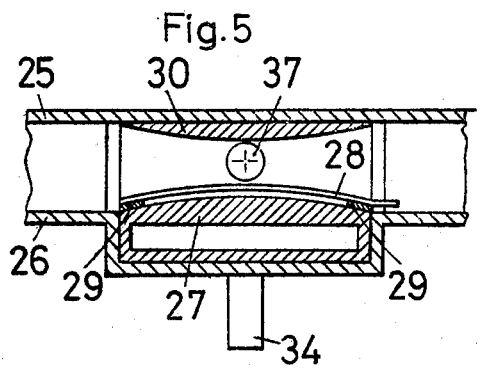
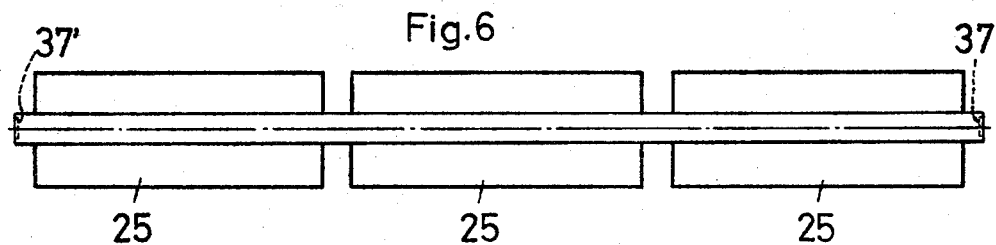
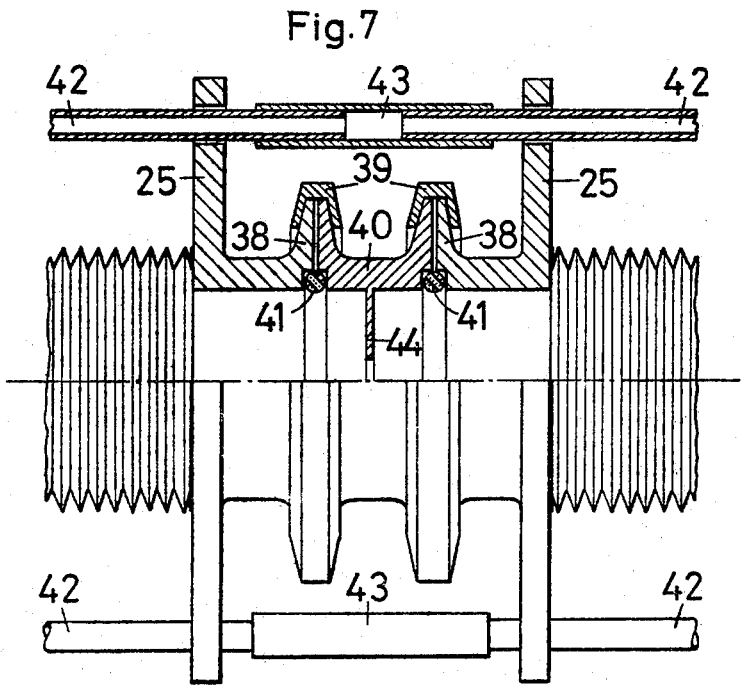

TRANSVERSELY ELECTRICALLY EXCITED ATMOSPHERIC PRESSURE GAS LASER WORKING IN PULSES (TEA LASER)

BACKGROUND OF THE INVENTION

The invention relates to a transversely electrically excited atmospheric pressure gas laser (TEA-laser) working in a pulsed mode, with a cooled working gas conducted in circulation, and including a cooled cathode, an anode arranged at a distance thereto, and an open-worked auxiliary electrode arranged between the cathode and the anode.

In gas lasers a plasma obtained by means of a glow discharge is used for generating a coherent electromagnetic radiation with wave lengths that correspond to light from ultraviolet to infrared. With modern TEA lasers, preferably $CO_2$ lasers, the gas is ionized by an electrical current flowing perpendicular to the beam diffusion direction. This current is supplied and conducted away through two parallel, planar electrodes between which the plasma is evenly distributed, thus giving off more energy to the plasma than is required for ionization. The excess energy partly is transformed into coherent electromagnetic radiation when two mirrors are provided to feedback the radiation amplified by the excited gas molecules. The resulting radiation output increases with a larger electrode surface, a greater electrode distance and a higher gas pressure. The latter, however is upwardly limited by the fact that, when a pressure of approximately 100 mbar is exceeded, the glow discharge, which initially homogenously fills up the volume between the electrodes, will develop into an arc discharge with a sufficiently high current flowing in only a narrow channel. Thereby only a much smaller plasma volume will be available for the generation of laser radiation, the effectiveness being no longer satisfactory (cf. e.g. w. W. Duley, $CO_2$-Lasers, Effects and Applications, Academic Press, New York, S. Francisco, London 1976, pages 15 to 72).

For preventing the development of an arc discharge, subdivided electrodes are frequently used with relatively high pressures. In such a case, however discharge instabilities occur, which instabilities can be prevented only by high ohmic pre-resistors at each electrode part, thus necessitating very high operational voltages. Another possibility already put into practice consists in that a principal electrode is designed as a grid and an auxiliary electrode covered with an insulating layer is arranged behind the grid beyond the main discharge volume. If a very high voltage is applied between this auxiliary electrode and the grid, a corona discharge will form, evenly coating the grid. If voltage pulses are applied between the grid and the other principal electrode, a glow discharge will form for the duration of the pulses, evenly filling up the main discharge volume. The disadvantage of this arrangement also is the very high voltage demand.

In U.S. Pat. Nos. 3,940,710 and 3,848,202 three-electrode arrangements are disclosed, each having open-worked auxiliary electrodes arranged between the cathode and the anode. The cathodes of the lasers according to the U.S. patents are pin-shaped and are called "pins". Between the individual pins and a hole located thereabove in the auxiliary electrode, inhomogenous discharges form that affect the formation of a large-area homogenous glow discharge.

SUMMARY OF THE INVENTION

The invention aims at avoiding the disadvantages and difficulties described and has as its object to provide a gas laser in which a plasma evenly distributed in space can be formed and maintained with great reliability, while at the same time keeping the voltage demand low and the pulse frequency high, and to provide a laser system with increased efficiency.

The invention with which this object is achieved comprises a TEA gas laser with a cathode designed as an elongated metallic conducting plate extending in the direction of the optical axis, and a metallic conducting auxiliary electrode arranged parallel to the cathode at an immediate distance therefrom, i.e. in the region of the cathode drop, for the purpose of producing a glow skin covering the entire cathode.

In a manner known per se the cathode plate suitably is hollowly designed or provided with cooling channels so as to permit a cooling liquid to flow therethrough.

The auxiliary electrode advantageously is subdivided into several sections electrically separated from one another and feedable by separate current sources.

According to one embodiment, the auxiliary electrode is switched in an electric circuit containing a unipolar voltage source delivering voltage pulses.

Between the cathode and the auxiliary electrode, a normal glow discharge is maintained, which discharge evenly covers the entire cathode surface. Due to the small distance, i.e. a few tenths of millimeters, between the cathode and the auxiliary electrode, no column discharge forms which can contract. Also the formation of an arc starting point is prevented by good cooling of the cathode. The glow discharge between the cathode and the auxiliary electrode is realized with approximately 1,000 V, thus advantageously requiring a much lower voltage than a corona discharge. When operating the laser according to the invention, a voltage in the region of some kilovolts is applied between anode and cathode; thereby the electrons, which are present in large numbers in the glow skin that covers the entire cathode, are evenly sucked through the auxiliary electrode and enter the main discharge volume between the auxiliary electrode and the anode. There they are accelerated by the high voltage to such an extent that they will produce a plasma by impact ionization. The formation of the plasma is effected in an entirely uniform manner over the total cross section of the discharge volume; thus an optimal operation of the laser is guaranteed. Since a much higher electron density is present in the glow discharge maintained between the auxiliary electrode and the cathode than in the corona discharge, the formation of the plasma in the main discharge volume takes place considerably more quickly and safely with the arrangement of the invention; this is very advantageous for the operation of the laser.

Preferably, the anode is connected via a spark gap, and the cathode is connected directly, to a capacitor, the capacitor being connected to a direct-voltage source for the purpose of charging the capacitor via a resistor.

In this manner, a rapid formation of a high voltage between the anode and cathode can be reached. Upon reaching a critical capacitor voltage, which is slightly higher than the breakthrough voltage of the spark gap, the voltage will be conducted to the anode. The charge stored in the capacitor then limits the duration of the current flow over the main discharge. The spark gap, which is used as a switch, can be replaced by a thyristor or other construction elements suited for this purpose, and an appropriate drive circuit.

Advantageous embodiments of the invention comprise an open-worked auxiliary electrode that (a) is formed by wires extending transversely to the longitudinal extension of the cathode plate, which wires are connected at their ends by conductors, or (b) is designed as a slotted plate or as a plurality of slotted plates, the slots extending perpendicular to the longitudinal extension of the cathode plate, or (c) is designed as a hole mask having holes of diameters of approximately 0.5 to 1 mm and an area ratio of hole face:bar face of approximately 1:3, or (d) is composed of closely—i.e. at a distance of approximately 1 to 2 mm—adjacent hollow rods having an outer diameter of approximately 2 mm, extending transversely to the longitudinal direction of the cathode and flowed through by a non-conducting coolant, which rods are separately electrically feedable. Also, preferably the anode is hollow having a non-conducting coolant flowing through.

The open-worked auxiliary electrode with its rims suitably lies on insulating film strips provided between the cathode and auxiliary electrode.

The auxiliary electrode advantageously is arranged parallel to the cathode at a distance of 0.2 to 0.7 mm, the cathode and the anode being designed as planar plates or as plates curved in the manner of a Rogowsky profile.

As insulating film strips, strips of polytetrafluoroethylene, such as Teflon ®, can particularly be used.

The extension of the cathode drop zone depends to a small extent on the nature of the laser gas. If $CO_2$ contained in the laser gas mixture is to be excited, a distance between the cathode and auxiliary electrode of 0.2 to 0.7 mm is optimal.

Electrodes that are curved in the manner of a Rogowsky profile improve the homogeneity of the electric field formed between them. Therefore, glow discharges that are driven in pulses between Rogowsky electrodes show less tendency to contract and thus a homogenous glow discharge can be maintained over a longer period of time.

According to a further preferred embodiment, the cathode, the open-worked auxiliary electrode arranged in the region of the cathode drop, and the anode are arranged in a closed casing. The longitudinal extent of the casing is a multiple—at least 10-fold—of the width and height dimensions of the casing, and the casing comprises slots arranged opposite one another substantially over its total length for entry and exit of the working gas. The working gas is preferably guided in circulation between the exit and entry via a heat exchanger and a pump, preferably at a speed of approximately 200 m/s.

For obtaining a higher output, preferably a plurality of such casings, each comprising a cathode, an auxiliary electrode arranged in the region of the cathode drop and an anode, are assembled into a chain with a laser system including TEA lasers. At one end of the chain one casing wall comprises a totally reflecting mirror and at the other end of the chain the casing wall comprises a partly transmissible mirror. All of the casing walls between the ends are connected to one another by gasproof coupling pieces, which, if desired are designed as mode screens.

According to another embodiment of the laser system, all casing walls between its ends are provided with windows which let through the wave length of the radiation produced.

As a laser gas, preferably a commercially available gas mixture containing $CO_2$ and He is used; but other gases, such as KrF, $N_2$, XeF, Ar, F, HF, CO or $N_2O$ are also suited. If necessary, also other mirrors that have been adapted to the respective wave length of the coherent radiation have to be used.

BRIEF DESCRIPTION OF THE DRAWINGS

The subject matter of the invention is explained in more detail by way of several embodiments and with reference to the drawings, wherein:

FIG. 5 illustrates an embodiment of the discharge volume modified with respect to the illustration of FIG. 3;

FIG. 6 illustrates a schematically represented series arrangement of several laser units; and FIG. 7 is an embodiment of a gasproof coupling between two neighbouring laser units.

DESCRIPTION OF EXEMPLARY EMBODIMENTS

Figure 1:
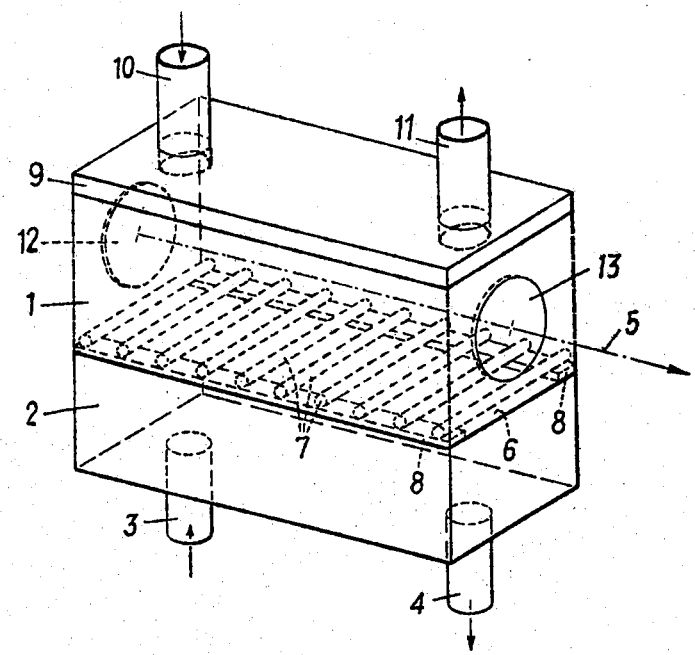
FIG. 1 illustrates a diagrammatic representation of an embodiment of a TEA laser according to the invention.

In FIG. 1 an elongated hollow metal cathode 2 is arranged in a gasproof casing 1 schematically illustrated in broken lines, which cathode comprises connecting sleeves 3 and 4 for supplying and conducting away cooling liquid. This cathode possesses an elongated metallic conducting plate 6 extending in the direction of the optical axis 5. In the immediate distance from this plate 6, i.e. at a distance of a few tenth millimeters, which is in the region of the cathode drop, grid rods 7 are adjacently arranged transverse to the longitudinal extent of the plate 6 and form a metallic conducting auxiliary electrode. For maintaining the desired distance, spacers 8 are provided between the ends of the rods and the cathode plate. The grid rods are connected with one another in an electrically conducting manner. Above the auxiliary electrode formed by the rods, anode 9 is positioned, which, in the example illustrated, includes connecting sleeves 10 and 11 for the entry and exit of filling gas, such as $CO_2$. In the front faces of the casing, amplification mirrors 12 and 13 are inserted. One of them—12—is completely reflective and the other—13—is partly transmissible in order to make possible the exit of the laser radiation.

Figure 2:
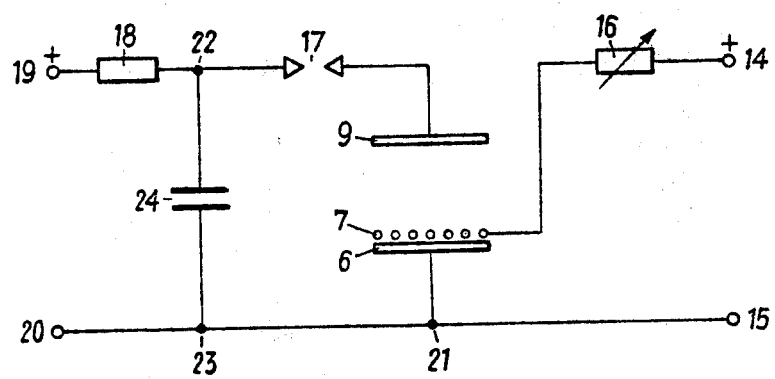
FIG. 2 is a circuit diagram pertaining to FIG. 1.

In the circuit diagram according to FIG. 2, the positively poled grid connection point is denoted by 14, and the cathode connection point is denoted by 15, between which is applied a direct voltage of such a value that a potential difference of approximately 1,000 V prevails between the auxiliary electrode 7 and the cathode 6. Thereby a normal glow discharge is formed between the cathode plate 6 and the grid rods 7. The current strength of the auxiliary discharge between grid and cathode can be controlled by a resistor 16. Since the normal glow discharge burns with a current density $J_n$ that is independent of the current, a current $I_g = J_n \cdot F_k$, where $F_k$ denotes the surface of the cathode, can be adjusted such that the glow discharge just covers the entire cathode surface. Since the distance of the grid from the cathode is not substantially larger than the extension of the cathode drop in the current flow direction, no column discharge paths will form in the auxiliary discharge, nor can it contract. By means of the cooling of the cathode, the formation of cathode arc starting points due to evaporation of the cathode material, is prevented so that an area of homogenous auxiliary discharge safely prevails between the grid and the cathode.

In the circuit diagram according to FIG. 2, the anode 9 lies, via a spark gap 17 and a resistor 18, at the positive pole 19 of a direct-voltage source, whose other pole is denoted by the connection 20. This other connection 20 is connected with the connection 21 of the cathode plate 6. Therebetween, i.e. between the connections 22 and 23, a capacitor 24 is provided, which capacitor is also directly connected with the cathode. The direct voltage between connections 19 and 20 charges the the capacitor 24 via the resistor 18.

If the capacitor voltage exceeds the breakthrough voltage of the spark gap 17, the latter will ignite and the capacitor voltage will be switched to the anode 9. Thereby electrons are uniformly sucked into the volume between grid and anode over the total grid surface. If the voltage of the anode is sufficiently high, these electrons can ionize gas atoms in large numbers. A plasma that is uniformly distributed in the discharge volume is consequently formed between the cathode and anode. As a result the discharge path between cathode plate 6 and anode 9 becomes well-conducting and the capacitor 24 can discharge. In the volume between grid 7 and anode 9, coherent laser radiation is generated by the plasma through amplification by means of the two mirrors 12, 13.

When the voltage at the capacitor 24 decreases so much that it is under the arc drop voltage of the spark gap 17, which is much smaller than its breakthrough voltage, the spark gap 17 interrupts the connection between the capacitor 24 and the anode 9. The discharge in the space between grid 7 and anode 9 will subside and the laser radiation will die out. Since the capacitor 24 now has been discharged to a great extent, it will be charged anew by the voltage applied at the connections 19, 20, and after reaching the breakthrough voltage of the spark gap 17 a new laser pulse is generated. The laser of the invention thus delivers pulsed laser radiation with the circuitry described, although it is driven only by constant voltages.

Figure 3:
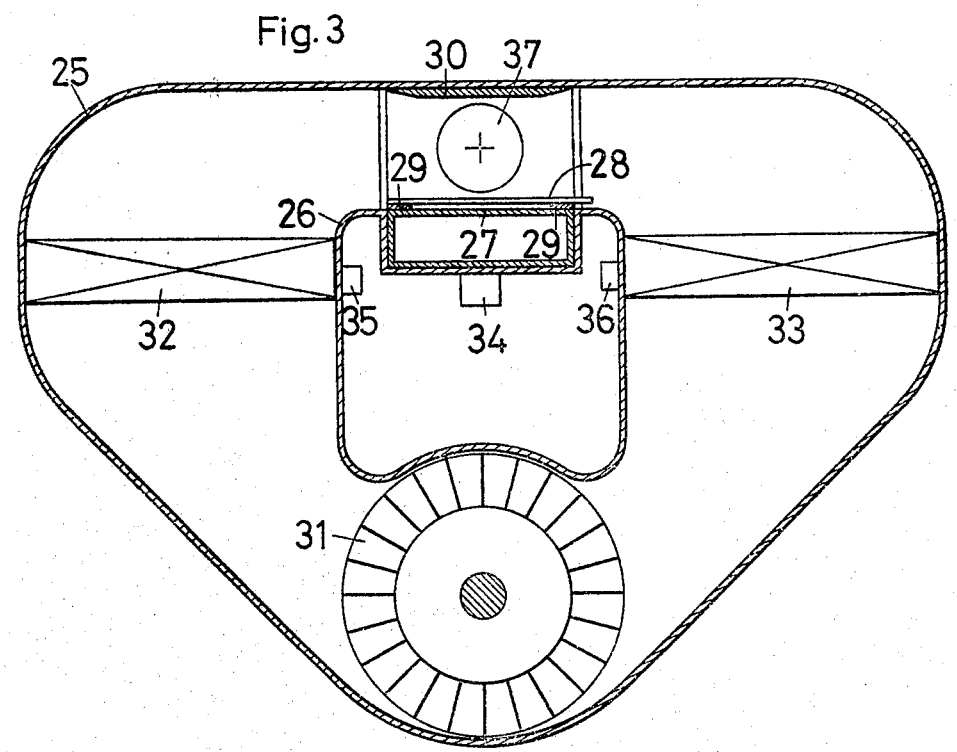
FIG. 3 is a cross section through an embodiment of a laser unit (laser module) with laser gas being conducted in circulation perpendicular to its optical axis.

In FIG. 3 the outer casing wall of a laser unit is denoted by 25, and the inner one by 26. On the upper side of the inner casing wall a receiving shaft for the hollow cathode 27 is provided, on which the auxiliary electrode 28 is arranged at a distance from the cathode by insulating film strips 29. This distance is chosen such that the auxiliary electrode is in the region of the cathode drop. On the inner side of the outer casing wall 25 there is an anode 30 positioned opposite both the cathode 27 and the auxiliary electrode 28. The discharge volume defined by the three electrodes is open along its total longitudinal extension relative to the gas volume delimited by the casing walls. The laser gas is conducted in circulation by means of a crossflow blower 31 via heat exchangers 32, 33 through the discharge volume in the direction transverse to the longitudinal axis of the casing. For cooling the hollow cathode, coolant connection sleeves 34 are provided, and connection sleeves 35, 36 are provided for supplying the heat exchangers 32, 33 with coolant. In the embodiment illustrated a mirror 37 is positioned on the visible front side of the casing wall, the optical axis of the laser module running through the center of the mirror.

Figure 4A:
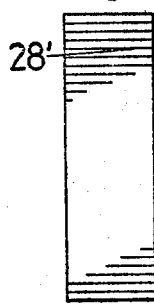
FIGS. 4a to 4f show top views of auxiliary electrodes designed in different manners.
Figure 4B:
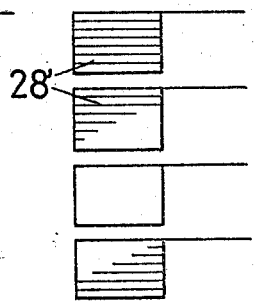

In FIG. 4a an auxiliary electrode of individual members or wires 28' that are connected with one another in a conducting manner is illustrated. FIG. 4b shows an auxiliary electrode of the same design, however a certain number of wires are each combined into a section feedable by separate current sources. The individual wires may have a diameter of about 0.3 mm and are arranged from one another at a distance of approximately 1 mm.

Figure 4C:
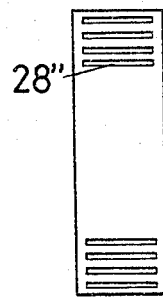
Figure 4D:
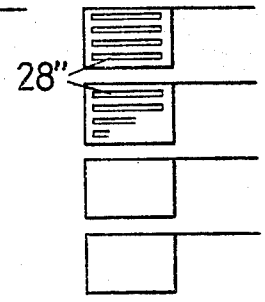

In FIG. 4c the design of an auxiliary electrode with slots 28'' is illustrated, and in FIG. 4d an electrode provided with slots and subdivided into sections in the manner of FIG. 4b is shown. The slot width may be approximately 0.5 mm, that of the members or bars arranged therebetween is 1 mm.

Figure 4E:
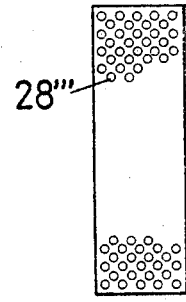
Figure 4F:
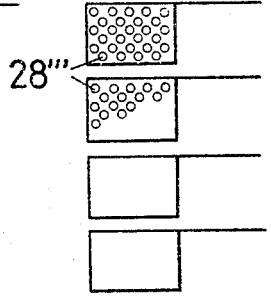

A particularly suitable auxiliary electrode designed in the manner of a shadow mask 28''', as is used in TV picture tubes, is represented in FIGS. 4e and 4f, wherein the electrode may again be subdivided as in FIG. 4f.

The utilization of a shadow mask subdivided into sections is particularly preferred since the glow skin spreads best over the entire electrode surface, if the auxiliary electrode shows no preferential direction, as is the case with individual grid threads or grid rods arranged transversely to the discharge. Only with very high output powers is the utilization of an auxiliary electrode of adjacently arranged cooled rods necessary simultaneously with the utilization of a cooled anode. In this case a non-conducting cooling liquid must necessarily be used for the grid and the anode. The latter embodiment, in addition to a further improved cooling of the laser gas, also offers the advantage of safely preventing short circuits between the auxiliary electrode and the cathode, since the cooled rods will not bend through to the cathode.

Furthermore, in the beam spreading direction the auxiliary electrode can exhibit a periodic structure with a period length that is an integral multiple of the wave length of the laser radiation produced. Thus the laser radiation can be scattered into all directions by the structurized grid surface. In the spreading direction the laser radiation interferes in an extinguishing manner and in the opposite direction it interferes in an amplifying manner, whereby the necessary feedback of the laser radiation can be effected without mirrors.

A discharge volume in which both the cathode 27 and the anode 30 show Rogowsky profiles is illustrated in FIG. 5. The auxiliary electrode 28 is arranged parallel to the cathode. Also all other constructional parts are denoted by the same reference numerals as in FIG. 3.

In FIG. 6 there is schematically illustrated a plurality of laser modules, whose casing outer walls are denoted by 25, that can be assembled to form a laser system. On one end wall of the laser system, a totally reflecting mirror 37 is provided and on the other end wall a partially transmissible mirror 37' is provided. For space saving reasons it is also possible to deflect the laser beam several times, if desired, thus enabling the laser modules to be adjacently assembled at an angle to their optical axis.

For a gasproof connection of two laser units, the casing walls 25 facing each other, according to FIG. 7, may comprise a flange 38, which is pressed to the corresponding counter flange of a coupling piece 40 by means of a bracket 39. As a seal, an O-ring 41 is each provided. Tubes 42 are connected with the casing walls 25, which tubes serve for exactly adjusting the necessary distance between the laser units and the mirrors arranged in the end walls, respectively. The tubes 42 are fixable by means of a connection piece 43 at a certain distance from each other. The coupling piece 40 represented in the drawing is designed as a mode screen 44.

Since the operating expenses of, for instance, $CO_2$ lasers are based to a great extent on the helium proportion in the laser gas, a laser with a closed gas circulation according to FIG. 3 is of a particular advantage. Since the working gas, however, strongly heats up when passing through the discharge space, thus lowering the degree of effectiveness and the output power of the laser, a good cooling of the gas by, for instance, water-supplied heat exchangers 32, 33 is required. The streaming through of the discharge volume transversely to its longitudinal extension also has the purpose of reducing the heating up of the gas, since a greater gas volume can be moved. By the crossflow blower 31 shown in FIG. 3 a gas flow of broad cross section and high speed is produced.

The casing parts enclosing the discharge volume preferably are produced of glass or synthetic material. For obtaining a laser beam of a good optical quality the mirror distance must be exactly defined and considerably temperature-independent. Therefor tubes 42 of, for instance, invar steel can be used and are arranged at the corners of the discharge volume (not shown). The optical resonator is composed of a planar, partly transmissible mirror (approximately 80% reflection) and a curved, totally reflecting mirror whose radius of curvature is considerably larger than the distance between the two mirrors. This resonator design has the advantage that it can be simply adjusted because the laser will still operate with a slight maladjustment. With the serial arrangement of several laser modules according to FIGS. 6 and 7, the radius of curvature of the totally reflecting mirror has to be larger than the overall optical length to the partly transmissible mirror.

With the coupling piece 40, which, according to FIG. 7, is designed as a mode screen 44, a laser oscillation is reached in the base mode in that the diameter of the circular penetration opening of the mode screen is dimensioned such that only the base mode $TEM_{oo}$ can go through without hindrance. All of the higher modes are damped thereby and the starting of their oscillation is prevented. The laser oscillation in the base mode is desirable, since such a beam can be focussed best, thus offering the most beautiful cutting surfaces and welding seams when being applied in material treatment.

A TEA-$CO_2$-laser unit according to the invention shows, for instance, the following technical data:

| | |
|---|---|
| Wave length: | 10.6 μm |
| Degree of effectiveness: | 15% |
| Output beam power: | up to 500 W, pulsed |
| Beam cross section: | approximately 1 cm$^2$ |
| Pulse width: | variable |
| Pulse repetition rate: | 1 kHz |
| Composition of gas mixture: | 20% $CO_2$, 20% $N_2$, 60% He |
| Pressure: | approximately 1 bar |
| Flow rate of gas mixture: | 200 m/s |
| Dimensions of discharge volume: | length: 100 cm, width = height: 2 cm |
| Voltage between cathode and auxiliary electrode/ overall current: | approximately 2 kV/2 A |
| Peak voltage between cathode and anode/current | 5 to 10 kV/4 A |

The operational parameters for laser gases of other compositions fall within comparable measurements.

If a plurality of laser units are assembled into a laser system, the optical output will increase approximately linearly with the number of laser modules, all of the technical data of the individual modules remaining unchanged. The output in some cases increases even more than the linear value, since, with the resonator used, a thicker beam will appear with a greater mirror distance, the utilization of the active plasma thus being improved.

What we claim is:

1. In a transversely electrically excited atmospheric pressure gas laser (TEA laser) working in a pulsed mode to produce an output along an optical axis and having a cathode drop region, said laser including a cooled working gas conducted in circulation, a cooled cathode, an anode arranged at a distance from said cooled cathode, and an open-worked auxiliary electrode arranged between said cathode and said anode, the improvement which is characterized in that said cathode is designed as a metallic conducting, elongated cathode plate arranged in a plane and having a longitudinal extent in the optical axis direction, and said auxiliary electrode, which is also metallic and conducting, is arranged parallel to said cathode at a distance therefrom which is in the cathode drop region, so as to produce a glow skin covering all of said cathode, said open-worked auxiliary electrode being formed by a plurality of members extending transverse to the longitudinal extent of said cathode and being spaced closely adjacent each other, said members being in a plane parallel to and having the same profile as the plane of the cathode plate.

2. A TEA laser as set forth in claim 1, wherein said auxiliary electrode is subdivided into several sections electrically separated from one another, separate current sources being provided for feeding said several sections.

3. A TEA laser as set forth in claim 1, wherein an electric circuit containing a current source delivering unipolar voltage pulses is provided, said auxiliary electrode being incorporated into said circuit.

4. A TEA laser as set forth in claim 1, wherein said auxiliary electrode is designed as a hole mask including holes having a diameter of approximately 0.5 to 1 mm and an area ratio of hole face: bar face of approximately 1:3, the holes of the mask separating the members of the auxiliary electrode.

5. A TEA laser as set forth in claim 1, wherein said auxiliary electrode is arranged parallel to said cathode at a distance of 0.2 to 0.7 mm therefrom, said cathode and said anode being designed as plates curved into a plane in the Rogowsky profile manner.

* * * * *